United States Patent
Lomas

(10) Patent No.: US 8,634,938 B2
(45) Date of Patent: Jan. 21, 2014

(54) METHOD FOR SAFELY PARAMETERIZING AN ELECTRICAL DEVICE

(75) Inventor: Adam Lomas, Havelock (CA)

(73) Assignee: Siemens Aktiengesellschaft, Munich (DE)

( * ) Notice: Subject to any disclaimer, the term of this patent is extended or adjusted under 35 U.S.C. 154(b) by 377 days.

(21) Appl. No.: 12/975,029

(22) Filed: Dec. 21, 2010

(65) Prior Publication Data

US 2011/0178614 A1  Jul. 21, 2011

(30) Foreign Application Priority Data

Dec. 23, 2009  (EP) .................................. 09180665

(51) Int. Cl.
*G05B 11/01* (2006.01)
*G05B 15/00* (2006.01)
*G05B 9/02* (2006.01)

(52) U.S. Cl.
USPC ............................................. 700/17; 700/79

(58) Field of Classification Search
USPC ................. 700/17, 79, 83; 726/26; 713/1
See application file for complete search history.

(56) References Cited

U.S. PATENT DOCUMENTS

| | | | |
|---|---|---|---|
| 2004/0148513 A1* | 7/2004 | Scott et al. | 713/200 |
| 2005/0075844 A1* | 4/2005 | Mueller et al. | 702/189 |
| 2006/0111794 A1* | 5/2006 | Wysuph et al. | 700/19 |
| 2009/0125760 A1* | 5/2009 | Schlette | 714/718 |

FOREIGN PATENT DOCUMENTS

| | | |
|---|---|---|
| DE | 202008015021 U1 | 7/2009 |
| EP | 1662346 A2 | 5/2006 |
| GB | 2283116 A | 4/1995 |

* cited by examiner

*Primary Examiner* — Sean P. Shechtman
*Assistant Examiner* — Steven Garland
(74) *Attorney, Agent, or Firm* — Cozen O'Connor

(57) ABSTRACT

A method for safely parameterizing an electrical device, wherein a parameter input by a user on a control unit is transmitted to the electrical device and stored therein with write protection, the stored parameter is transmitted back to the control unit and displayed at the control unit for confirmation by the user, and the user confirmation is transmitted to the electrical device. In accordance with the invention, the stored parameter is transmitted back together with the name of the parameter, with a code generated by the device and in a data format which cannot be processed by the control unit. The returned parameter, the name of the returned parameter and the code are displayed for the user on the control unit, and the confirmation is checked in the electrical device to determine whether the confirmation contains the code.

6 Claims, 1 Drawing Sheet

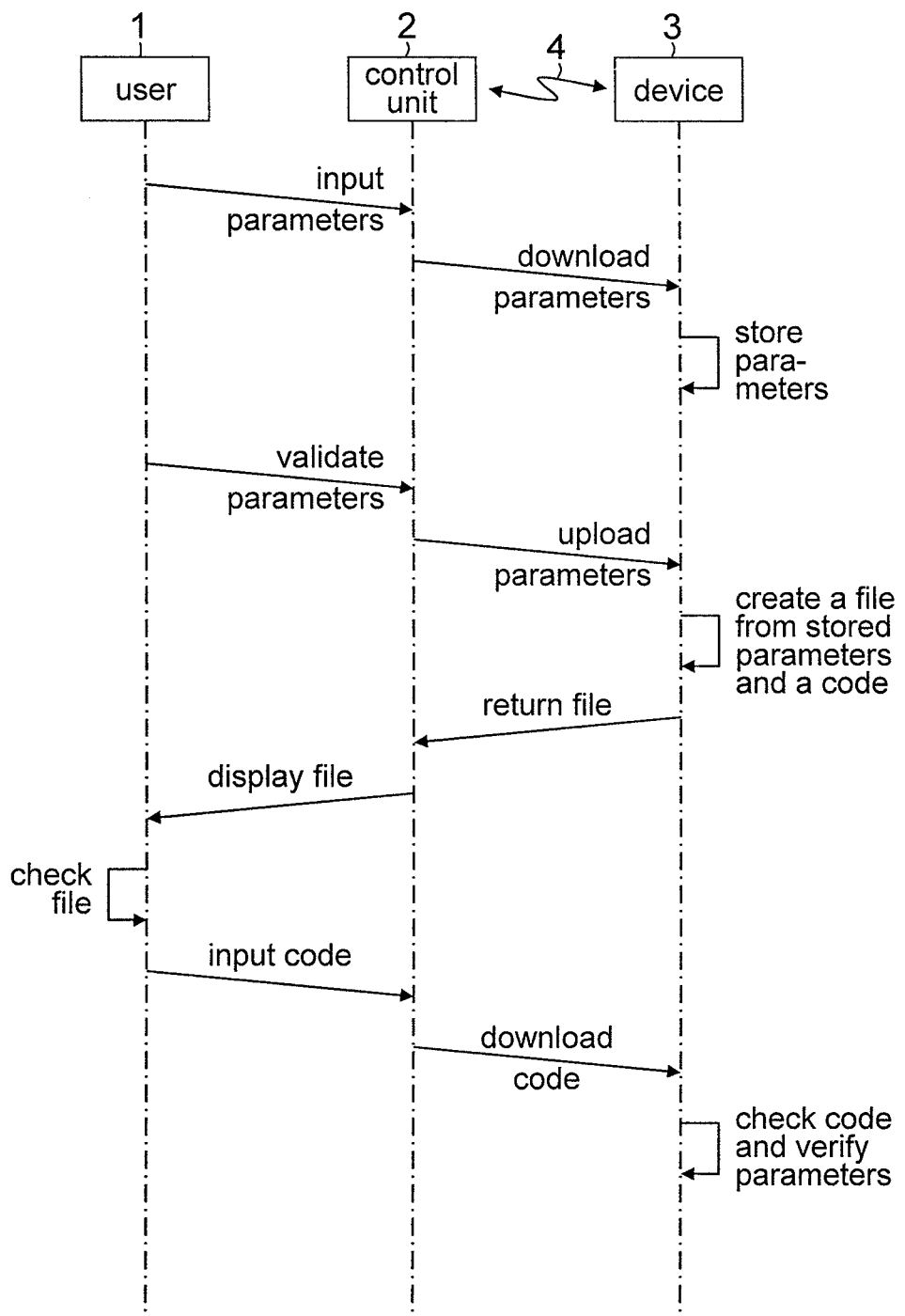

METHOD FOR SAFELY PARAMETERIZING AN ELECTRICAL DEVICE

BACKGROUND OF THE INVENTION

1. Field of the Invention

The invention relates to process automation field devices and, more particularly, to a method for safely parameterizing an electrical device, where a parameter input by a user on a control unit is transmitted to the electrical device and stored therein with write protection, the stored parameter is transmitted back to the control unit and displayed at the control unit for confirmation by the user, and the confirmation is transmitted to the electrical device.

Such parameterizable electrical devices include, for example, process automation field devices such as measuring transducers or valve positioners.

2. Description of the Related Art

When parameterizing electrical devices or systems that perform a safety function and therefore require certification in accordance with the basic International Electrotechnical Commission (IEC) safety standard 61508, it must be ensured that safety-relevant parameters actually correspond to those input by the user and that they can no longer be changed without a new user input. Each safety-relevant parameter is re-displayed for the user in a diverse format and the user individually confirms each parameter to validate the parameters. Here, it must be ensured that the parameters transmitted for the purpose of confirmation correspond to the values actually stored in the device. As long as there is no validated set of parameters, safety-related operation of the device is not possible.

EP 1 662 346 A2 describes different methods for safely parameterizing an electrical device, here an automation field device. Here, the parameters can be directly input on a display and control unit (on-site control) of the field device or on a separate control unit (e.g., a laptop or Highway Addressable Remote Transducer (HART) handheld device), which is connected to the field device through a field bus or is directly connected to a service interface of the field device, and is transmittable from there to the field device.

As described in EP 1 662 346 A2, during on-site input, it is possible to monitor the parameters that have been input in that each individual character is displayed on the display unit of the field device and, following input, all values are re-displayed and are confirmed by the user.

When inputting the parameters with a separate control unit, it is possible to write and revise the data in the control unit. The control program writes the data input by the user to the field device over the service interface or the field bus, re-reads out the data stored in the field device and compares them with the input values. In this respect and to increase safety when writing and reading, the data can be transmitted with different data types to exclude systematic or random errors in the transmission protocol.

Safety-relevant parameters must be stored in the field device with write protection so that they cannot be subsequently changed. In order to ensure that only a write-protected parameter, i.e., a parameter which can no longer be changed, is reported back to the control unit and is confirmed as being correct there. In other words, in order to prevent a parameter from being reported back to the control unit and being confirmed as correct there before it has been stored with write protection, it is conceivable to generate a check value, such as a cyclic redundancy check (CRC) value. The CRC value is generated both for the parameter input on the control unit and for the parameter that has been stored in the field device with write protection, using the same checking algorithm in each case and both check values are compared for a match when reporting the stored parameters to the control unit. However, the use of check values is not possible if, as mentioned above, the data are transmitted with different data types when writing to the field device and reading from the field device.

Finally, EP 1 662 346 A2 describes the possibility to additionally input the parameters, which have been input on the field device directly or with the separate control unit connected to the field device, on a monitoring device. The same checking program runs in the field device and in the monitoring device respectively, and uses the parameters which have been input to respectively generate a check value, such as a CRC check value. The check value determined by the monitoring device must then be input on the field device and the input of the parameters is accepted only if the check value calculated in the field device matches the check value calculated by the monitoring device and input on the field device.

SUMMARY OF THE INVENTION

It is therefore an object of the invention to provide a method for improving the safety of a device during parameter entry.

This and other advantages are achieved in accordance with the invention by providing a method in which a stored parameter is transmitted back together with the parameter's name and with a code generated by the device and in a data format which cannot be processed by the control unit, the returned parameter, the name of the returned parameter and the generated code are displayed for the user on the control unit, and a confirmation is checked in the electrical device to determine whether it contains the code.

The method in accordance with the invention is independent of the format in which the parameters are stored in the electrical device because the user confirms the data contents (parameter value in connection with the parameter's name) rather than the data format.

Transmitting the stored parameter together with the name of the parameter back to the control unit saves time for the user who is manually comparing the input and returned parameters, and reduces the probability of user error in comparing the parameters.

In accordance with the invention, the parameter, the name of the parameter and the code are returned in a non-processable data format. As a result, the control unit is prevented from modifying the returned parameter or displaying offline data in place of the returned parameter. The parameters are normally transmitted from the control unit to the electrical device in unsecured form so that the parameters may be buffered at any location on the way to the electrical device. As a result of the use of the non-processable data format, a data error during transmission can be detected and it is ensured that no buffered parameters are erroneously transmitted back to the control unit or read back from the control unit and accepted as correct parameters at the control unit by the user.

Preferably, a text format is used as the non-processable data format. The text format is human-readable, i.e., the text can be read without further conversion, and is generally directly supported by the control unit.

By returning the write-protected parameters together with a code, preferably a CRC check value, which is generated by the electrical device and needs to be confirmed by the user it is ensured that the parameter stored in the electrical device is also actually displayed for the user. The user's confirmation is checked in the electrical device to determine whether it contains the code. In the event of a positive confirmation, the entire configuration is accepted by the device. In the event of a negative confirmation, the entire configuration is rejected by the device.

For enhanced security, the code may be generated with a current time stamp, and the time stamp included in the confirmation is checked in the electrical device to determine whether it is within a given time-window.

All parameters must be confirmed together to prevent unintended changes, i.e., proof of the inability of a parameter to be changed after it has been confirmed must occur.

The method in accordance with the invention is used irrespective of whether the parameters are input directly on a display and control unit (i.e., a local user interface) of the field device or on a separate control unit, which is connected to the field device through a field bus or is directly connected to a service interface of the field device, and are transmitted from there to the field device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following detailed description of an exemplary embodiment of the invention, reference is made to the FIGURE of the drawing which shows a sequence diagram of the method according to the invention.

DETAILED DESCRIPTION OF THE PRESENTLY EMBODIMENTS

In the FIGURE, three blocks 1, 2 and 3 each represent a user, a control unit and an electrical device. The control unit 2 comprises input and display means (not shown) for inputting and displaying information. The electrical device 3 comprises storing means (not shown), such as an EEPROM, for storing information with write protection. There are further information exchanging means 4, e.g. a data interface, between the control unit 2 and the electrical device 3.

Safe parameterization of the electrical device 3 using the control unit 2 occurs as follows:

1. (input parameters): The user 1 enables parameterization by inputting a user password at the control unit 2. The user 1 can now input parameters. When input, the parameters are displayed and the user 1 can correct the input.

2. (download parameters): The parameters are jointly transferred to the electrical device 3. The parameters may be written individually, but they must be confirmed jointly.

3. (store parameters): The downloaded parameters are stored in the device 3 with write protection.

4. (validate parameters): The user 1 initiates the process to confirm the configuration stored in the device 3.

5. (upload parameters): The control unit 2 instructs the device 3 to create and transmit a file to be compared.

6. (create a file from stored parameters and a code): The electrical device 3 creates a file from the stored parameters, the names of the parameter and a code, such as a CRC value of the parameters, in a data format, such as a human-readable text format, which cannot be processed by the control unit 2.

7. (return and display file): The file is transmitted back to the control unit 2 that displays the file, i.e., the parameters and the names of the parameters and the code, to the user 1.

8. (check file): The user 1 compares each returned parameter against the input parameters. In that the returned parameters are displayed together with their names, the check is facilitated and made safe.

9. (input and download code): The user 1 confirms correctness of the stored parameters by inputting the displayed code (if necessary together with the user password). The code is transmitted to the electrical device 3.

10. (check code and verify parameters): The electrical device 3 checks the returned code against the code created in step 6 and, if the result is positive, accepts the stored parameters as a confirmed configuration. For enhanced security, the electrical device 3 may create the code with a current time stamp. The time stamp included in the returned code is then checked to determine whether it is within a given time-window, i.e., confirmation by the user 1 must be made within the time-window.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for safely parameterizing an electrical device, comprising:

transmitting a parameter input by a user into a control unit to the electrical device, the parameter being stored at the electrical device with write protection;

returning the stored parameter to the control unit by transmitting the stored parameter back to the control unit from the electrical device together with a name of the stored parameter, a code generated by the device and in a data format which cannot be processed by the control unit;

displaying the stored parameter, the name of the stored parameter and the code to the user on the control unit;

confirming, by the user, the stored parameter displayed on the control unit;

transmitting a confirmation to the electrical device, the confirmation comprising a code input by the user; and checking the confirmation in the electrical device to determine whether the confirmation contains the code input by the user.

2. The method as claimed in claim 1, wherein the data format is a text and cannot be processed by the control unit.

3. The method as claimed in claim 2, wherein the generated code is a cyclic redundancy check value.

4. The method as claimed in claim 1, wherein the generated code is a cyclic redundancy check value.

5. The method as claimed in claim 1, wherein the generated code is generated with a current time stamp, and wherein the time stamp is included in the confirmation and is checked in the electrical device to determine whether the confirmation is within a given time-window.

6. A method for safely parameterizing an electrical device, comprising:
  transmitting a parameter input by a user into a control unit to the electrical device, the parameter being stored at the electrical device with write protection;
  returning the stored parameter to the control unit by transmitting the stored parameter back to the control unit from the electrical device together with a name of the stored parameter, a code generated by the device and in a data format which cannot be processed by the control unit;
  displaying the stored parameter, the name of the stored parameter and the code to the user on the control unit;
  confirming, by the user, the stored parameter displayed on the control unit;
  transmitting a confirmation to the electrical device; and
  checking the confirmation in the electrical device to determine whether the confirmation contains the code;
  wherein the code is generated with a current time stamp, and wherein the time stamp is included in the confirmation and is checked in the electrical device to determine whether the confirmation is within a given time-window.

* * * * *